Sept. 17, 1935.     J. SCHUBERT     2,014,783
SNOWPLOW
Filed April 2, 1934
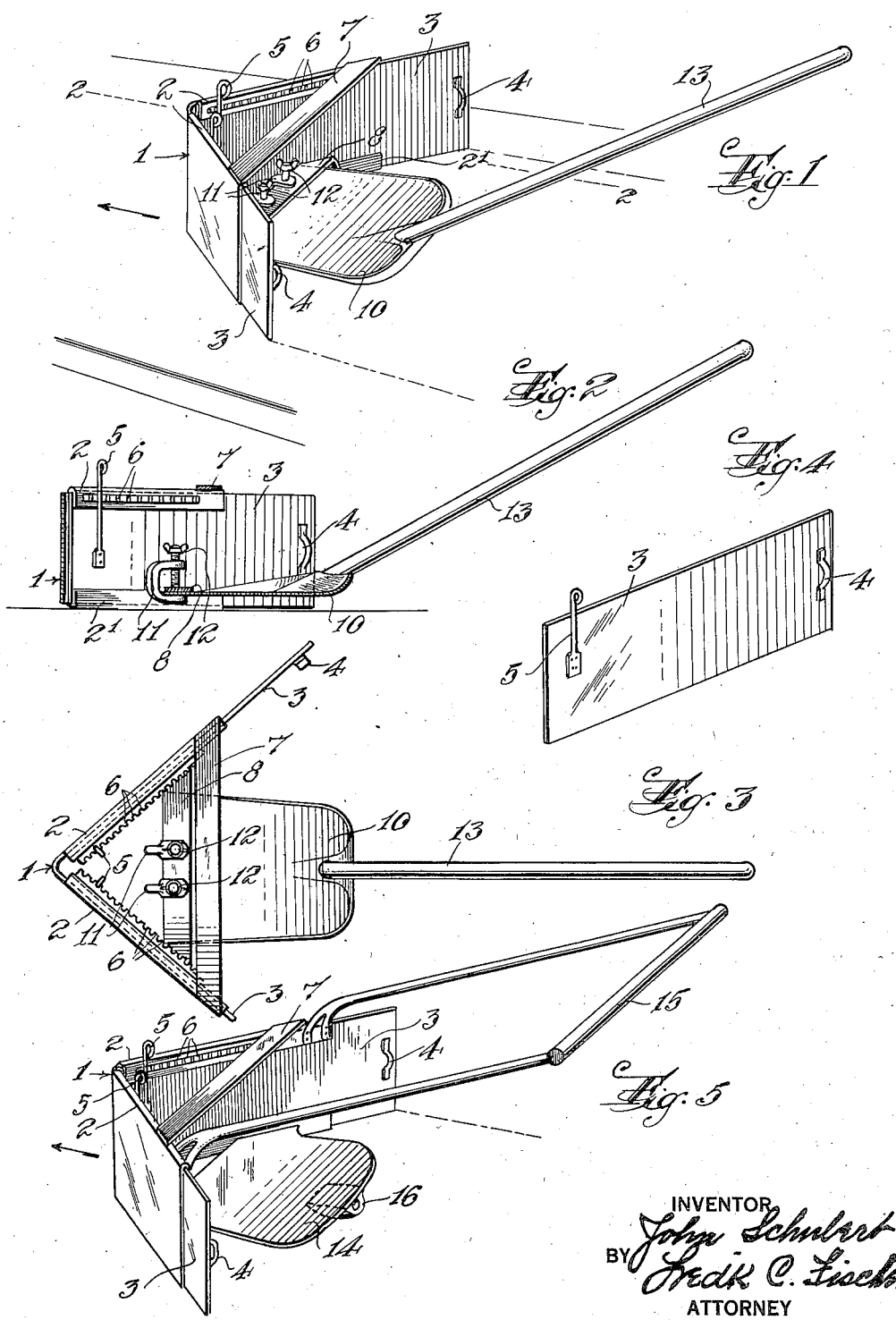

Patented Sept. 17, 1935

2,014,783

UNITED STATES PATENT OFFICE 2,014,783

SNOWPLOW

John Schubert, North Arlington, N. J.

Application April 2, 1934, Serial No. 718,625

5 Claims. (Cl. 37—53)

An object of my invention is to simplify the structure of a snow plow, so as to render the same positive yet effective in operation, simple in construction and durable in use.

A further object of my invention is to provide a snow plow of the V-type, the length of which may be varied for use in connection with snowfalls of various densities and depths.

A further object of my invention is to provide a snow plow comprising a V-shape member for engaging the snow and side members adapted to be adjustably secured to the V-shape member to vary the length thereof.

A further object of my invention is to provide a snow plow of the V-type having a central bearing whereby the plow may be tilted upwardly to facilitate plowing through deep snowfalls.

With the above and other objects in view the nature of which will more fully appear as the description proceeds, the invention consists in the novel construction, combination and arrangement of parts herein described, illustrated and claimed.

In the accompanying drawing, forming part hereof, similar characters of reference indicate corresponding parts in all the views:

Fig. 1 represents a perspective view of a snow plow embodying my invention,

Fig. 2 represents a vertical longitudinal sectional view taken along lines 2—2 of Fig. 1, Fig. 3 represents a top plan view of the form of my invention shown in Fig. 1.

Fig. 4 represents a perspective view of one of the side members used in connection therewith, and Fig. 5 represents a perspective view of another form of my invention.

The snow plow embodying my invention comprises a V-shaped member preferably made from a single piece of metal or suitable material and provided with flanges 2, 2' along the longitudinal edges thereof which form channels to slidably receive the side members 3—3.

The side members 3—3 may be moved relatively to the V-shaped member 1 by means of handles 4 to adjust the length of the snow plow for various requirements, and any suitable means may be provided for fixing the side members in their adjusted position.

For example, the side members 3—3 may be provided with spring fingers 5 adapted to selectively engage corrugations 6 in the flanges 2 of the V-shaped member 1, thereby securing the side members 3 in any predetermined position in the V-shaped member 1.

The V-shaped member 1 is preferably provided with any suitable reenforcing means such as lateral braces 7 and 8 secured respectively to the flanges 2, 2' as shown in the drawing.

In the form of my invention shown in Fig. 1, an ordinary shovel 10 is removably secured to the brace 8 by any suitable means such as by dogs 11 having thumb screws 12 or the like. In this form the snow plow is normally manipulated by means of the shovel handle 13. The shovel 10, as indicated in Fig. 2, is normally spaced from the surface on which the snow plow is being used, and when it is desired to plow through a very deep snowfall the shovel handle 13 is moved downwardly so that the shovel 10 will form a bearing to tilt the snow plow upwardly to first remove the top layers of snow.

If desired, the side members 3—3 may be withdrawn entirely from the V-shaped member 1 and when this is done the plow will be extremely light in weight but still efficient and positive in operation.

My invention is adapted for use in connection with an ordinary snow shovel as described, or, if desired, the shovel may be dispensed with and a flat bearing plate 14 may be provided and secured to the flanges 2' in any desired or convenient manner. A handle member 15 of any desired configuration may be secured to the V-shaped member 1, see Fig. 5. In this form of the invention the handle member 15 serves the same function as the shovel handle 13 and the bearing plate 14 serves the same function as the shovel 10 and brace 8 of Fig. 1.

If desired, in the form of invention shown in Fig. 5, the handle member 15 may be dispensed with and the bearing plate 14 may be provided with a socket 16 for the reception of any rod-like handle member (not shown).

The device is strong and light in weight and all parts may be made of any suitable light strong and durable metal at a minimum cost.

Experience has demonstrated that the organization above described, is a highly efficient one, and while the device described above is the preferred embodiment of my present invention, I do not care to restrict myself to the exact details of construction, combination and arrangement herein set forth, it being obvious that minor variations thereof not involving the exercise of invention may be made by any skilled mechanic, and such departures from what is herein described and claimed not involving invention, I consider as within the scope and terms of my claims.

Having thus described my invention, what I claim as new and desire to secure by Letters Patent, is:

1. In a snow plow, a V-shaped member for engaging the snow, said member being provided along its longitudinal edges with flanges to form channels and side members slidably received in said flanges to vary the length of the plow.

2. In a snow plow, a V-shaped member for engaging the snow, said member being provided along its longitudinal edges with flanges to form channels and side members slidably received in said flanges to vary the length of the plow, said side members and V-shaped member having interengaging means for adjustably securing the side members in the V-shaped member.

3. In a snow plow, a V-shaped member for engaging the snow, said member being provided along its longitudinal edges with flanges to form channels, side members slidably received in said flanges to vary the length of the plow, and lateral braces the ends of which are secured to the said flanges.

4. In a snow plow, a V-shaped member for engaging the snow, said member being provided with a longitudinal flange extending throughout the length thereof and forming a channel, and side members slidably received in and supported within said channel in a position parallel to the walls of said V-shaped member and designed to vary the length of the plow.

5. In a snow plow, a V-shaped member for engaging the snow, said member being provided with a longitudinal flange extending throughout the length of the V-shaped member, side members slidably received in said flange designed to vary the length of the plow, and lateral braces, the ends of which are secured to said flange.

JOHN SCHUBERT.